US012734772B2

(12) United States Patent
Gersman et al.

(10) Patent No.: US 12,734,772 B2
(45) Date of Patent: Sep. 15, 2026

(54) SEALANT COMPOSITION FOR SELF-SEALING PNEUMATIC TIRE

(71) Applicant: The Goodyear Tire & Rubber Company, Akron, OH (US)

(72) Inventors: Michael Lawrence Gersman, Cleveland, OH (US); George Jim Papakonstantopoulos, Medina, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 707 days.

(21) Appl. No.: 18/127,861

(22) Filed: Mar. 29, 2023

(65) Prior Publication Data

US 2024/0326361 A1 Oct. 3, 2024

(51) Int. Cl.

| | |
|---|---|
| ***B29C 73/16*** | (2006.01) |
| ***B60C 1/00*** | (2006.01) |
| ***B60C 19/12*** | (2006.01) |
| ***C08K 3/36*** | (2006.01) |
| ***C08L 23/22*** | (2025.01) |
| *B29K 23/00* | (2006.01) |
| *B29L 30/00* | (2006.01) |

(52) U.S. Cl.

CPC .......... *B29C 73/163* (2013.01); *B60C 1/0016* (2013.01); *B60C 19/12* (2013.01); *C08K 3/36* (2013.01); *C08L 23/22* (2013.01); *B29K 2023/22* (2013.01); *B29L 2030/002* (2013.01)

(58) Field of Classification Search

CPC ........... B29C 73/16; B60C 1/00; B60C 19/12; C08K 3/36; C08L 23/22

USPC .......................................................... 523/166

See application file for complete search history.

(56) References Cited

U.S. PATENT DOCUMENTS 1,419,470 A 6/1922 Reasoner et al.
1,601,013 A 9/1926 Wildman
1,977,281 A 10/1934 Knowlton
3,048,509 A 8/1962 Sweet et al.
4,082,703 A 4/1978 Duffy et al.
4,089,360 A 5/1978 Bohm
4,113,799 A * 9/1978 Van Ornum ........... C09J 123/22 524/274
4,140,167 A 2/1979 Bohm et al.
4,171,237 A 10/1979 Anderson et al.
4,228,839 A 10/1980 Bohm et al.
4,426,468 A 1/1984 Ornum et al.
5,587,416 A 12/1996 Chevallier et al.
5,708,069 A 1/1998 Burns et al.
5,789,514 A 8/1998 Burns et al.
5,800,608 A 9/1998 Bomal et al.
5,882,617 A 3/1999 Chevallier et al.
6,107,226 A 8/2000 Chevallier
6,180,076 B1 1/2001 Uhrlandt et al.
6,221,149 B1 4/2001 Bomal et al.
6,268,424 B1 7/2001 Blume et al.
6,322,811 B1 11/2001 Verma et al.
6,335,396 B1 1/2002 Chevallier et al.
6,837,287 B2 1/2005 Smith, Sr. et al.
7,071,258 B1 7/2006 Jang et al.
7,550,610 B1 6/2009 Chang et al.
7,585,481 B2 9/2009 Dodson
7,674,344 B2 3/2010 D'Sidocky et al.
8,221,849 B2 7/2012 Naito
8,360,122 B2 1/2013 Wilson
9,334,169 B2 5/2016 Guy et al.
9,359,215 B2 6/2016 Allain et al.
9,427,918 B2 8/2016 Son et al.
9,677,025 B2 6/2017 Voge et al.
9,802,446 B2 10/2017 Dahlke et al.
10,730,255 B2 8/2020 Barjon et al.
12,036,756 B2 * 7/2024 Papakonstantopoulos .................. C08K 5/14
2002/0081247 A1 6/2002 Dodson
2003/0118500 A1 6/2003 Chevallier et al.
2004/0062701 A1 4/2004 Valero et al.
2005/0032965 A1 2/2005 Valero
2005/0034799 A1 2/2005 Serra et al.
2005/0113502 A1 * 5/2005 Fitzharris Wall ..... B29C 73/163 524/425
2006/0254687 A1 11/2006 Sandstrom
2008/0115872 A1 5/2008 Sandstrom et al.
2019/0291511 A1 * 9/2019 Alexander .............. B60C 19/12
2022/0097326 A1 3/2022 Papakonstantopoulos et al.
2022/0111609 A1 4/2022 Papakonstantopoulos et al.
2022/0410516 A1 * 12/2022 Gersman ............ B29D 30/0685

FOREIGN PATENT DOCUMENTS

CN 114058293 A 2/2022
EP 0647591 A1 4/1995

OTHER PUBLICATIONS

Extended European Search Report for Application No. 24166663.5, dated Jul. 31, 2024.

* cited by examiner

*Primary Examiner* — Deve V Hall
(74) *Attorney, Agent, or Firm* — Mandy B. Willis

(57) ABSTRACT

A sealant composition suited to forming a sealant layer in a tire includes 100 phr elastomers, including at least 60 phr of an isobutylene-based elastomer component, and at least 5 phr of a conjugated diene-based elastomer component. The sealant composition further includes at least 5 phr of particulate filler, at least 0.5 phr of an organic peroxide, and optionally a colorant which provides the sealant with a non-black color.

17 Claims, 2 Drawing Sheets

SEALANT COMPOSITION FOR SELF-SEALING PNEUMATIC TIRE

FIELD OF THE INVENTION

Aspects of the invention relate to a sealant composition suited to use for sealing punctures in a pneumatic tire, to a tire incorporating the composition, and to a method of manufacture.

BACKGROUND

Puncture sealing tires are designed to retard or prevent the loss of air and consequential deflation after the tire has been punctured with a sharp object, such as a nail, screw, or another object which is capable of piercing through the tire.

The sealant composition ("sealant") is generally encased or encapsulated between layers of the tire. For example, the sealant may be arranged in separate cells or sheets, so that a puncturing object penetrating the tread portion of the tire will pass through enough of the sealant to seal the tire against escape of inflation air through the puncture.

Pneumatic tires with puncture sealing capabilities initially employed an unvulcanized layer of rubber as a sealant. (see, e.g., U.S. Pat. Nos. 1,419,470A, 1,601,013A, and 1,977,281A). Later, sealant compositions were developed to provide longer service for the tire after being punctured. This allows for the continued use of the tire until it can be driven to a more convenient location for it to be repaired or replaced. For example, U.S. Pat. No. 3,048,509A describes an unvulcanized synthetic rubber sealing composition containing a 1,3-butadiene-styrene copolymer and softening and tackifying agents in the form of sheets separated by covering sheets composed mainly of a vulcanized rubber compound.

Butyl rubber, a copolymer of isobutylene and isoprene, has also been used in a sealant composition. See, for example, U.S. Pat. Nos. 4,228,839A, 4,171,237A, 4,140,167A, and 4,426,468A and U.S. Pub. No. 2005/0034799 A1.

Sealant compositions incorporating dispersed particulate precured rubber materials have also been used, as described in U.S. Pat. No. 6,837,287B2. Inorganic particulate materials have also been used in sealant compositions. U.S. Pat. No. 9,427,918B2 describes a sealant composition including a raw rubber, polybutene, treated silica, and a peroxide. The raw rubber in the sealant composition can be natural rubber, butyl rubber, or a blend of natural rubber and butyl rubber. U.S. Pat. No. 9,802,446B2 discloses a sealant including expandable graphene structures and microspheres.

Other sealant compositions and tires containing them are disclosed in U.S. Pat. Nos. 4,089,360A, 4,140,167A, 4,228,839A, 4,426,468A, 7,674,344B2, 8,221,849B2, 8,360,122B2, 9,677,025B2, 10,730,255B2 and U.S. Pub. Nos. 20080115872A1, 20220097326A1, 20220111609A1, and 20220410516A1.

One drawback with many existing sealant compositions is that when the tire is punctured, the sealant composition continues to flow beyond the puncture hole. This may cause the tire to become out of balance and may also pose cleanup problems. In other cases, the sealant coating is not operable or effective over a wide temperature range extending from hot summer to cold winter conditions.

There remains a need for a sealant composition which is able to self-seal punctures made in a tire, which would otherwise result in air loss and the ultimate deflation of the tire, while also reducing excessive flow of the sealant composition in the event of a puncture.

BRIEF DESCRIPTION

In accordance with one aspect of the exemplary embodiment, a sealant composition includes 100 phr elastomers, the elastomers including at least 60 phr of an isobutylene-based elastomer component, and at least 5 phr of a conjugated diene-based elastomer component. The sealant composition further includes at least 5 phr of particulate filler, and at least 0.5 phr of an organic peroxide.

The sealant composition may include a colorant which provides the sealant with a non-black color. The colorant may be selected from yellow pigments, yellow dyes, and mixtures thereof.

The isobutylene-based elastomer component of the sealant composition may be selected from the group consisting of butyl rubber, polyisobutylene, and mixtures thereof. The isobutylene-based elastomer component may be at least 80 wt. % butyl rubber. The isobutylene-based elastomer component may have a weight average molecular weight of at least 5,000, or at least 30,000 and/or of no more than 800,000. The sealant composition may include at least 75 phr of the isobutylene-based elastomer.

The conjugated diene-based elastomer component of the sealant composition may be selected from the group consisting of natural rubber, synthetic polyisoprene, polybutadiene, styrene-butadiene copolymer, and mixtures and copolymers thereof. The conjugated diene-based elastomer component may be at least 80 wt. % natural rubber. The sealant composition may include at least 8 phr of the conjugated diene-based elastomer component.

The sealant composition may include up to 40 phr of the particulate filler. The particulate filler may include at least one of silica, titanium dioxide, calcium carbonate, and carbon black. The sealant composition may include at least 5 phr silica. The sealant composition may contain, in total, no more than 1 phr of black reinforcing fillers selected from carbon black, graphite, graphene, and mixtures thereof.

The organic peroxide in the sealant composition may be selected from dicumyl peroxide; 2,5-bis(tert-butylperoxy)-2,5-dimethyl hexane; 1,1-di-tert-butyl peroxy-3,3,5-trimethyl cyclohexane; 2,5-dimethyl-2,5-di(tert-butylperoxy) hexyne-3; p-chlorobenzyl peroxide; 2,4-dichlorobenzyl peroxide; 2,2-bis-(tert-butylperoxy)-butane; tert-butyl cumyl peroxide; di-tert-butyl peroxide; benzoyl peroxide; 2,5-bis(tert-butylperoxy)-2,5-dimethyl hexane; 2,5-dimethyl-2,5-di(tert-butylperoxy)hexane; and mixtures thereof.

The sealant composition may further include at least 0.1 phr of polyalkylene glycol.

In accordance with another aspect of the exemplary embodiment, an uncured pneumatic tire includes a circumferential tread, a supporting carcass attached to the tread, a sealant layer including the sealant composition described above, and a containment layer, the sealant layer being disposed between the supporting carcass and the containment layer.

The containment layer of the uncured pneumatic tire may include a halobutyl rubber.

A cured pneumatic tire may be formed by curing the uncured pneumatic tire described above at a sufficient temperature for the organic peroxide to depolymerize the isobutylene-based elastomer component at least partially.

In accordance with another aspect of the exemplary embodiment a method of forming a sealant layer includes forming a sealant composition including 100 phr elastomers, the elastomers comprising at least 60 phr of an isobutylene-based elastomer component and at least 5 phr of a conjugated diene-based elastomer component, a particulate filler, a colorant, and an organic peroxide. The method further includes treating the sealant composition to a sufficient temperature for a sufficient time to decompose the isobutylene-based elastomer component, at least partially, to form the sealant layer.

The method may further include, before treating the sealant composition, forming an uncured tire including a layer of the sealant composition.

In accordance with another aspect of the exemplary embodiment a method of manufacturing a pneumatic rubber tire having a puncture sealing feature includes building an unvulcanized tire including a circumferential rubber tread, a supporting carcass, a containment layer, and a sealant layer disposed intermediate the supporting carcass the containment layer. The sealant layer includes a sealant composition, which includes 100 phr elastomers. The elastomers include at least 60 phr of an isobutylene-based elastomer component and at least 5 phr of a conjugated diene-based elastomer component. The sealant composition further includes a particulate filler and an organic peroxide. The method further includes curing the unvulcanized tire at a sufficient temperature to depolymerize the isobutylene-based elastomer component, at least partially, and to produce the pneumatic rubber tire having the puncture sealing feature.

DETAILED DESCRIPTION

Figures 1, 2:
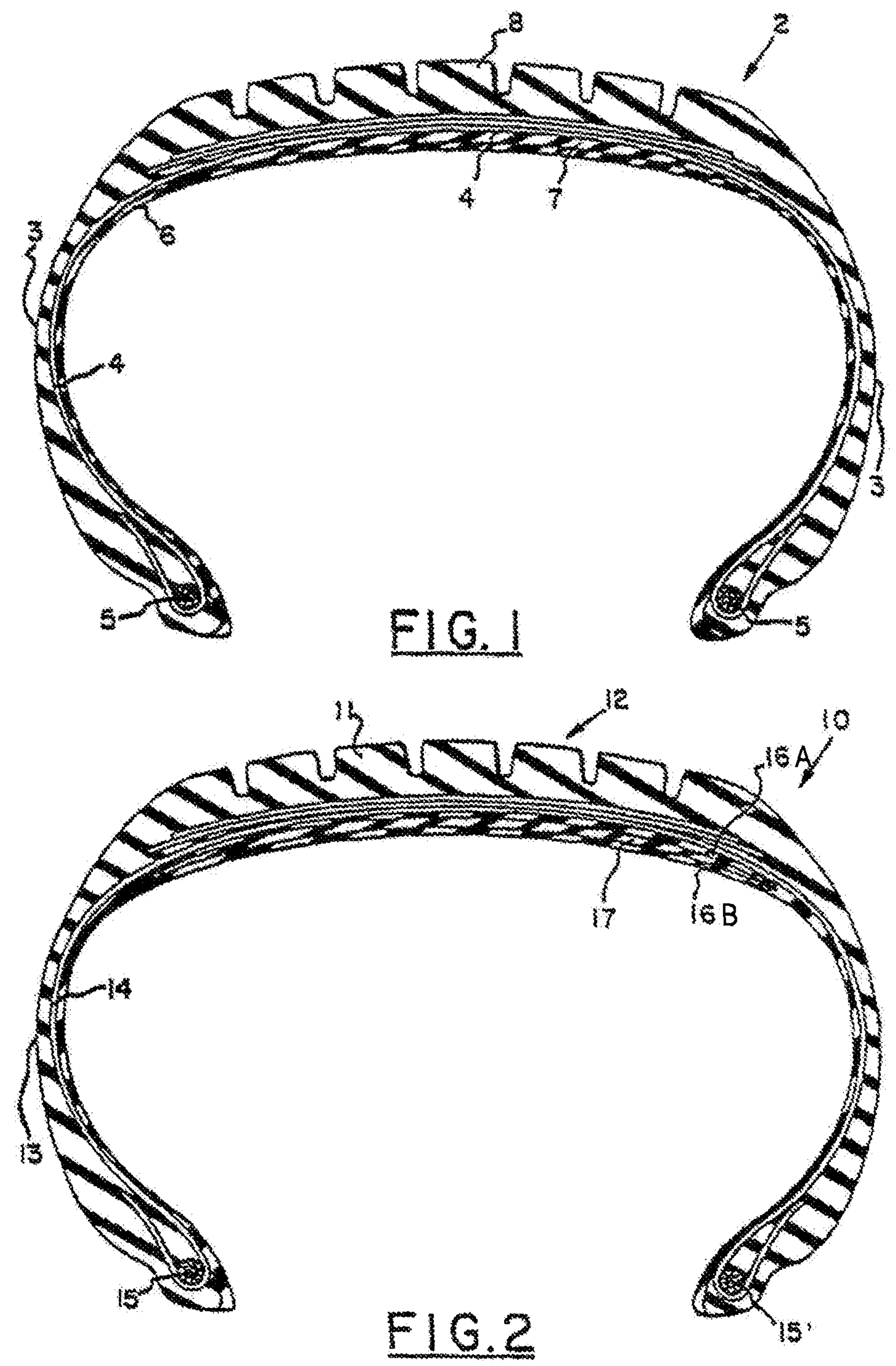
FIG. 1 is a cross-sectional view of a tire with a sealant layer disposed between an inner liner and a carcass of the tire, in accordance with one aspect of the exemplary embodiment.
FIG. 2 is a cross-sectional view of a tire with a sealant layer disposed between first and second inner liner layers, in accordance with another aspect of the exemplary embodiment.

Described herein is a sealant composition (or "sealant") suited to use in an enclosure of a pneumatic tire. The sealant serves to seal punctures in tires by flowing to fill the voids, while minimizing excess sealant flow out of the enclosure and maintaining sealability performance over extended periods.

In the description of this invention, the term "phr" refers to parts of a respective material per 100 parts by weight of rubber, or elastomer. The term "phf" refers to parts per hundred filler, by weight. By convention, the unreacted rubber (i.e., excluding any precured rubber particles used as a filler) employed in the sealant composition, totals 100 phr.

The terms "rubber" and "elastomer" may be used interchangeably unless otherwise indicated.

As used herein, Mooney viscosity is measured at 125° C. according to ASTM D1646-19a, "Standard Test Methods for Rubber-Viscosity, Stress Relaxation, and Pre-Vulcanization Characteristics (Mooney Viscometer)."

The glass transition temperature (Tg) of an elastomer or elastomer composition, where referred to herein, represents the glass transition temperature(s) of the respective elastomer or elastomer composition in its unreacted state or possibly a reacted state in the case of an elastomer composition. Tg values referred to herein are determined as a peak midpoint by a differential scanning calorimeter (DSC) at a temperature rate of increase of 10° C. per minute, according to ASTM D3418-21, "Standard Test Method for Transition Temperatures and Enthalpies of Fusion and Crystallization of Polymers by Differential Scanning Calorimetry."

In the following, the sealant composition, methods of preparation, and an illustrative tire incorporating the sealant composition are described.

The Sealant Composition

The exemplary sealant composition is formed by curing a mixture which includes an isobutylene-based elastomer having a low level of unsaturation, a conjugated diene-based elastomer having a high level of unsaturation, and a peroxide, such as a free radical-generating organoperoxide. The butylene-based elastomer of the sealant composition is capable of being partially depolymerized in situ within a tire by the free radical generating organoperoxide. The sealant may incorporate one or more particulate filler materials, such as silica and clay. One or more colorants may be present in the sealant composition to contrast with the black of the tire as an aid to identifying a puncture in the tire. A processing oil and/or polyalkylene oxide polymer, such as polyethylene glycol, may also be present in the sealant composition. As will be appreciated, the sealant composition is not limited to these components.

The sealant composition is used to provide a built-in sealant layer (or two or more layers) for a pneumatic tire. Each sealant layer is derived by (partial) depolymerization of the butylene units of the butylene-based elastomer in the sealant composition. The sealant layer or layers may be positioned inward of the tread of the tire, depending upon the position of the built-in sealant layer. The sealant layer can be built into the tire to form a tire assembly in a suitable mold or on a core. The butylene units of the butylene-based elastomer of the sealant composition can be depolymerized during a subsequent curing of the tire at an elevated temperature to form the tire having the resultant built-in sealant layer.

While not fully understood, it is contemplated that the conjugated diene-based elastomer component forms a matrix in the reacted sealant which constrains the lower molecular weight butyl chains derived by depolymerization of the isobutylene-based elastomer component. This creates a reacted sealant layer in the tire which is able to flow to only a limited degree when the tire is punctured (sufficient to be noticeable) while allowing the pressure within the tire to be maintained at a drivable level for an extended period of days or weeks.

1. Elastomers

The exemplary sealant composition includes two elastomer components, an isobutylene-based elastomer component and a conjugated diene-based elastomer component. Together, these two elastomer components may be at least 80 phr, or at least 90 phr, or at least 95 phr, or 100 phr in the sealant composition.

A. Isobutylene-Based Elastomer Component

The isobutylene-based elastomer component may be at least 60 phr, at least 70 phr, at least 75 phr, or at least 80 phr in the sealant composition, and/or up to 95 phr, up to 92 phr, or up to 90 phr. The isobutylene-based elastomer component consists of one or more elastomers derived from isobutylene. For example, the isobutylene-based elastomer component may be selected from butyl rubber, polyisobutylene, and mixtures thereof. In one embodiment, the isobutylene-based elastomer is at least 80 wt. % or at least 90 wt. %, or at least 95 wt. %, or 100 wt. % butyl rubber.

Butyl rubber is a copolymer of isobutylene and a conjugated diene, in particular, isoprene. In one embodiment, isobutylene-derived units account for a majority of the units in the copolymer, while isoprene-derived units account for a minority of the units. For example, a ratio of isobutylene-derived units to isoprene-derived units may be at least 90:10 or at least 95:5 or at least 98:2, or at least 98.5:1.5, or at least 99:1, or up to 99.5:0.5. The use of a butyl rubber with a low unsaturation content (e.g., a ratio of isobutylene-derived units to isoprene-derived units of up to 2) promotes a more efficient depolymerization by the organoperoxide. The presence of the double bonds within the butyl rubber tend to terminate its depolymerization when the depolymerization process reaches the double bond unsaturation in the butyl rubber, allowing a partial, but incomplete, depolymerization to take place. As the butyl rubber is at least partially depolymerized by the organoperoxide present in the sealant composition, a by-product of such depolymerization is isobutylene.

The butyl rubber may have a weight average molecular weight Mw of at least 30,000, or at least 40,000, such as up to 800,000, or up to 600,000, or up to 400,000. The butyl rubber may have a relatively high Mooney viscosity at 125° C., e.g., in a range of from 25 to 60, or at least 40, or up to 60.

Example butyl rubbers include butyl rubber sold as Exxon 068™ from the ExxonMobil Company, which is a copolymer of isobutylene and isoprene having less than 1% units derived from isoprene, and having a Mooney viscosity at 125° C. of about 51.

Polyisobutylene (PIB) is a homopolymer of isobutylene, i.e., formed without an unsaturated monomer, such as isoprene. Polyisobutylene suited to use in the isobutylene-based elastomer component may have a weight average molecular weight Mw of at least 5,000, or at least 10,000, or at least 30,000, or at least 40,000, or at least 50,000, such as up to 800,000, or up to 600,000, or up to 400,000, or up to 150,000. Additionally, the polyisobutylene may have a polydispersity (Mw/Mn) which is within the range of 1.6 to 4.0, and a glass transition temperature which is within the range of −55° C. to −70° C., such as within the range of −62° C. to −66° C., or within the range of −63° C. to −65° C. The polyisobutylene elastomer may optionally be stabilized with a small amount of an antioxidant, such as from 100 ppm to 1,000 ppm of an antioxidant, or 300 ppm to about 700 ppm. A variety of antioxidants can be employed, such as butylated hydroxytoluene (BHT).

Examples of polyisobutylene which are suitable for use are available from BASF as Oppanol® B10, Oppanol® B12, and Oppanol® B15. Oppanol® B10 has a weight average molecular weight Mw of 53,000, a viscosity average molecular weight Mv of 40,000, and a glass transition temperature (Tg) of −64° C.; Oppanol® B12 has a weight average molecular weight of 70,000, a viscosity average molecular weight of 55,000, and a glass transition temperature (Tg) of −64° C.; and Oppanol® B15 has a weight average molecular weight of 108,000, a viscosity average molecular weight of 85,000, and a glass transition temperature (Tg) of −64° C.

In one embodiment, the sealant composition is free or substantially free (less than 1 phr) of polybutene, particularly low molecular weight polybutene (Mw of less than 8,000). Polybutene is a polymer formed from a mixture of 1-butene, 2-butene, and isobutylene.

B. Conjugated Diene-Based Elastomer Component

The conjugated diene-based elastomer component may be at least 5 phr, at least 6 phr, or at least 8 phr in the sealant composition, and/or up to 40 phr, up to 25 phr, up to 20 phr, or up to 15 phr. The conjugated diene-based elastomer component consists of one or more elastomers derived solely, or predominantly (at least 60 wt. %, or at least 80 wt. %, or at least 90 wt. %, or at least 95 wt. %) from a conjugated diene. The conjugated diene-based elastomer component may be selected from natural rubber, synthetic polyisoprene, polybutadiene, styrene-butadiene copolymers, and mixtures and copolymers thereof. In one embodiment, the conjugated diene-based elastomer component is at least 80 wt. % natural rubber.

Natural rubber is derived predominantly from isoprene (2-methyl-1,3-butadiene) and thus is predominantly (e.g., at least 99 wt. %) polyisoprene. As used herein, the term "natural rubber" means naturally-occurring rubber, such as can be harvested from sources such as *Hevea* rubber trees and non-*Hevea* sources (e.g., guayule shrubs and dandelions such as TKS). In other words, the term "natural rubber" should be construed so as to exclude synthetic polyisoprene. Natural rubber produced from field grade coagulum (cuplump) from the *Hevea brasiliensis* tree is a common form of natural rubber. For example, technically specified or block rubber (TSR), is a natural rubber available from Indonesia, where it may be referred to as Standard Indonesian Rubber (SIR), Malaysia (SMR), and Thailand (STR). It can be obtained in a number of grades, including TSR 10 and TSR 20, with the TSR 10 grade being of higher purity.

In one embodiment, the conjugated diene-based elastomer component is at least 80 wt. % natural rubber, or at least 90 wt. %, or up to 100 wt. % natural rubber.

Synthetic polyisoprene, in particular, cis-1,4-polyisoprene with a cis content of at least 94 wt. % is also suitable. The cis-1,4-content of the synthetic polyisoprene may be at least 96 wt. %. The Tg of the synthetic polyisoprene may be in a range of −60° C. to −70° C.

A ratio by weight of the conjugated diene-based elastomer component (in particular, natural rubber) to the isobutylene-based elastomer component (in particular, butyl rubber) in the sealant composition may be at least 5:95, or at least 10:90, or at least 15:85, or at least 17:83, or at least 20:80, or at least 25:75, or up to 40:60, or up to 30:70.

2. Filler

A particulate filler may be included in the sealant composition. In the following, fillers that are said to be absent from the sealant composition may nonetheless be present in trace amounts, e.g., as conventionally found as impurities in other particulate fillers.

The particulate filler(s) may be present in the sealant composition, in total, in an amount of at least 5 phr, or at least 10 phr, or at least 15 phr or at least 20 phr, or up to 75 phr, or up to 60 phr, or up to 50 phr, or up to 40 phr, or up to 30 phr, or up to 25 phr, or up to 20 phr.

Example particulate fillers useful herein include silica, calcium carbonate ($CaCO_3$), titanium dioxide, hydrous aluminum silicate clay, 2:1 layered silicate clay and organophilic clay formed therefrom, calcium silicate, carbon black, graphite, graphene, carbon nanotubes, wollastonite, talc, diatomaceous earth, starch, lignin, alumina, polymeric fillers, and mixtures thereof.

In one embodiment, the filler includes silica particles, such as amorphous (e.g., precipitated) silica and/or crystalline silica. The term "silica" is used herein to refer to silicon dioxide, $SiO_2$ (which may contain minor amounts of impurities, generally less than 1 wt. %, resulting from the process in which the silica is formed). The term "precipitated silica"

is used to refer to synthetic amorphous silica, typically obtained by a process in which a silicate is precipitated with an acidifying agent.

Precipitated silica may be prepared by digesting amorphous silica, e.g., found in rice husks or other biological wastes, with sodium hydroxide to form sodium silicate and precipitating silica from sodium silicate by reaction with an acidifying agent, such as sulfuric acid or carbon dioxide. The resulting silica precipitate is washed and filtered. Methods for the preparation of precipitated silica are disclosed in U.S. Pat. Nos. 5,587,416A, 5,800,608A, 5,882,617A, 6,107,226A, 6,180,076B1, 6,221,149B1, 6,268,424B1, 6,335,396B1, 7,585,481B2, 9,334,169B2, 9,359,215B2, U.S. Pub. Nos. 20020081247A1 20030118500A1, 20040062701A1, 20050032965A1, and EP0647591A1. Precipitated silica may also be formed from silica gel as described, for example, in U.S. Pat. Nos. 5,708,069A, 7,550,610B1, and 5,789,514A. Silica gels may be derived, for example, by hydrophobating a silica hydrogel with, for example, an organomercaptosilane and alkyl silane and drying the product.

The precipitated silica may have a nitrogen (BET) surface area in a range of 100 to 350 $m^2/g$. The BET (nitrogen) surface area of precipitated silicas is determined according to ASTM D 1993-18, "Standard Test Method for Precipitated Silica-Surface Area by Multipoint BET Nitrogen Adsorption," which relates to the conventional theory described by Brunauer, Emmett and Teller in the Journal of the American Chemical Society, Volume 60, p. 309 (1938).

Example precipitated silicas include Hi-Sil™ 532 and Hi-Sil™ 532 EP from PPG Industries; Hubersil™ 4155 from the J. M. Huber Company; Zeosil™, under the designations 115GR, 125GR, 165GR, 175GR, 185GR, 195GR, 1085GR, 1165MP, 1115MP, HRS 1200MP, Premium MP, Premium 200MP, Premium SW, and 195HR from Solvay; Ultrasil™, under the designations VN2, VN3, VN3GR, 5000GR, 7000GR, 9000GR from Evonik; Zeopol™, under the designations 8755LS and 8745 from Evonik; Newsil™, under the designations 115GR and 2000MP, from Wuxi Quechen Silicon Chemical Co., Ltd; and Tokusil™ 315 from Maruo Calcium Co., Ltd.

The silica may have been surface treated, e.g., with a coupling agent and/or a polyalkylene oxide, such as polyethylene glycol, prior to incorporating the pretreated silica into the sealant composition to enhance dispersion and/or adherence to the elastomers. The coupling agent and/or polyalkylene oxide may also help to inhibit the tendency for associated water of hydration or hydroxyl groups on the silica to cause premature decomposition of the organoperoxide that is intended to depolymerize the butyl rubber in the sealant composition. In another embodiment, the silica may be treated in situ, within the sealant composition, prior to addition of the organoperoxide, with a coupling agent and/or polyalkylene oxide.

Polyalkylene glycols which may be used for pretreatment or in situ in the sealant composition are described in greater detail below.

Suitable coupling agents generally include a first moiety, that is reactive with hydroxyl groups (e.g., silanol groups) that are present on the surface of precipitated silica and a second moiety capable of reacting with a diene-based elastomer. The two moieties are connected by a linking group, e.g., a hydrocarbyl or sulfidic bridge, such that the precipitated silica is chemically bonded to the elastomer. Examples of silica coupling agents include those containing groups such as alkyl, alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. The silica coupling agent may be present in an amount sufficient to provide a ratio of the total amount of coupling agent to silica filler of at least 0.1:100 or up to 1:5, by weight, e.g., a ratio of at least 1:100, or at least 1:50, or up to 1:20, or up to 1:10.

In one embodiment, silica is present in the sealant composition at 1 phr or more, such as at least 2 phr, or at least 5 phr, or at least 6 phr, or at least 7 phr, or up to 20 phr, or up to 18 phr, or up to 15 phr, or up to 14 phr, or up to 12 phr, or up to 10 phr. The silica may be at least 10 phf or at least 20 phf, or at least 30 phf, or up to 100 phf, or up to 99 phf, or up to 95 phf of the particulate fillers.

In one embodiment, a ratio of silica to natural rubber is at least 0.4:1, and may be up to 1:1. In one embodiment, a ratio of silica to butyl rubber is at least 0.7:10, and may be up to 1.1:10.

Silicate clays which may be used in the sealant composition include layered silicate clays and organophilic clays derived therefrom. Example layered silicate clays include montmorillonite, bentonite, hectorite, saponite, nontronite, beidellite, fluorohectorite, stevensite, volkonskoite, sauconite laponite, and physical blends thereof. Useful organophilic clays are silicate clays that have been chemically modified to make them compatible with organic materials. The silicate clay used as a starting material can include one or more of montmorillonite, hectorite, saponite, attapulgite and sepolite. These clays include exchangeable cationic species such as sodium, potassium, or calcium ions on their surface and between clay galleries or layers. In the course of manufacturing an organophilic clay, at least a portion of these exchangeable cationic species is substituted by an organic cation, such as a quaternary amine, an organophosphorus ion, or the like.

Silicate clay may be absent from the sealant composition or present in the sealant composition at 0.5 to 20 phr, such as at least 1 phr, or at least 2 phr, or at least 5 phr, or up to 10 phr.

Calcium carbonate may also be used as a filler, e.g., in combination with silica. A benefit of using calcium carbonate is to provide a modified degree of reinforcement, as compared to the silica, which can aid in processing of the sealant composition and, in combination with the silica, in providing a suitable stiffness, and associated dimensional integrity for the partially depolymerized sealant composition.

In one embodiment, calcium carbonate may be used as a carrier for the organoperoxide.

Calcium carbonate may be absent from the sealant composition or may be present in the sealant composition at 0.5 phr or more, such as at least 5 phr, or at least 10 phr, or at least 15 phr, or at least 18 phr, or up to 30 phr, or up to 25 phr, e.g., serving as a carrier for the organoperoxide. A ratio of calcium carbonate to organoperoxide may be at least 20:80 or at least 30:70, or up to 70:20, or up to 60:40, or up to 50:50.

Carbon black, when used in the sealant composition, may have a CTAB specific surface area of at least 100, or at least 102, or at least 104, or up to 120, or up to 118, or up to 116 $m^2/kg$. Exemplary carbon blacks include ASTM designations N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991, as specified by ASTM D1765-21, "Standard Classification System for Carbon Blacks Used in Rubber Products."

In one embodiment, the sealant composition is free or substantially free (no more than 1 phr) of carbon black. In another embodiment, carbon black is present in the sealant composition at from 2 to 20 phr, or up to 10 phr, or up to 5 phr.

Graphene, when used in the sealant composition, is generally a one-atom-thick crystalline form of carbon in which carbon atoms are held together by sigma bonds that are arranged in a two-dimensional honeycomb lattice. More specifically, graphene is a crystalline allotrope of carbon with 2-dimensional properties. The carbon atoms in graphene are densely packed in a regular atomic-scale hexagonal (chicken wire) pattern. Each atom has four bonds, one a bond with each of its three neighbors and one π-bond that is oriented out of plane. The distance between adjacent carbon atoms in graphene is approximately 0.142 nanometers. The graphene used as a particulate filler can have a zig-zag, armchair, K-region, gulf, bay, cove, and/or fjord edge configuration. At least 50%, at least 60%, at least 70%, or at least 80% of the carbon-carbon bonds on the edges of the graphene structure may be in one of the zig-zag configuration, the armchair configuration, and the bay configuration. For example, of the carbon-carbon bonds on the edges of the graphene structure, at least 40%, 50%, or 60% may be in the zig-zag configuration, less than 40%, or less than 30% may be in the cove configuration, and less than 20% may be in the fjord configuration.

Exemplary graphene that may be used as a particulate filler is exfoliated into nano-scaled graphene plate (NGP) material that is essentially individual single sheets of graphene or a plurality of sheets of graphite planes. Each graphite plane is generally a two-dimensional hexagonal structure of carbon atoms. Each plane has a length and a width parallel to the graphite plane and a thickness orthogonal to the graphite plane such that at least one of the values of length, width, and thickness is 100 nanometers (nm) or smaller. Generally, each of the length, width and thickness values is smaller than 100 nm. This NGP material can be produced, for example, by a process as described in U.S. Pat. No. 7,071,258B1.

In one embodiment, the sealant composition is free or substantially free (no more than 1 phr) of graphene. In another embodiment, graphene is present in the sealant composition at from 2 to 20 phr, or up to 10 phr, or up to 5 phr.

In one specific embodiment, black particulate filler derived from a form or carbon, such as carbon black, graphite, graphene, and/or carbon nanotubes, is no more than 5 phr, or no more than 1 phr in the sealant composition.

Titanium dioxide when used as a filler, can also serve as a colorant. Titanium dioxide useful herein may have an average particle diameter of at least 0.1 micrometer (μm), such as at least 0.2 μm, or up to 5 μm, or up to 4 μm. Scattering of light by titanium dioxide is maximized in particles that are 0.2 to 0.3 μm in diameter. Accordingly, to serve as a colorant, at least 50 wt. % of the particles may be in this range.

In one embodiment, the sealant composition is free or substantially free (no more than 0.1 phr) of titanium dioxide. In another embodiment, titanium dioxide is at least 0.1 phr in the sealant composition, e.g., at least 1 phr, or up to 10 phr, or up to 5 phr, or up to 3 phr.

Example polymeric fillers in particulate form that are useful herein include polypropylene, precured rubber, and mixtures thereof. In general, particles of such fillers may have an average size of less than 10 micrometers (μm).

The polypropylene suitable for use as a filler may be of a low molecular weight. Such low molecular weight polypropylene may have a weight average molecular weight ($M_w$) of at least 4,000, or at least 6,000, or at least 8,000, or at least 10,000, or up to 40,000, or up to 25,000, or up to 20,000, or up to 15,000. Polypropylene may be utilized as a replacement or partial replacement for carbon black and/or mineral fillers, where lower levels may be employed than is the case with these other fillers (e.g., 30-40 wt. % less).

In one embodiment, polymer fillers are absent from the sealant composition. In another embodiment, polymer fillers are present in the sealant composition in a total amount of at least 1 phr, or up to 15 phr.

3. Processing Oil

The sealant composition may optionally include one or more processing oils. Suitable processing oils include aromatic oils, paraffinic oils, naphthenic oils, triglyceride oils, and low polycyclic aromatics (PCA) oils, such as mild extract solvate (MES), treated distillate aromatic extract (TDAE), special residual aromatic extract (SRAE), and heavy naphthenic oils, and mixtures thereof. Suitable low PCA oils may include those having a polycyclic aromatic content of less than 3 wt. %, as determined by the IP346 method. A description of the IP346 method may be found in Standard Methods for Analysis & Testing of Petroleum and Related Products and British Standard 2000 Parts, 2003, 62nd edition, published by the Institute of Petroleum, United Kingdom. Suitable naphthenic, paraffinic processing oils having a maximum aromatic content of less than 15 wt. % are exemplary. Such processing oils may have 35 to 45 wt. % naphthenic content, 45 to 55 wt. % paraffinic content, and an aromatic content of less than 15 wt. % (e.g., from 10 to 14 wt. %).

Example naphthenic processing oils include Hyprene™ 100 from Ergon Refining, Inc., and Tufflo 100™ from the Barton Solvent Company.

Triglyceride oils that can be used include vegetable oils, including vegetable oils, castor oil, soybean oil, canola oil (rapeseed oil), corn oil, cottonseed oil, olive oil, palm oil, safflower oil, sunflower oil, coconut oil, and peanut oil. Castor oil is a triglyceride oil that contains approximately 87 wt. % ricinoleic acid, 7 wt. % oleic acid, 3 wt. % linoleic acid, 2 wt. % palmitic acid, and 1 wt. % stearic acid.

The processing oil, in relatively low concentrations, aids in mixing the ingredients for the sealant composition and/or promotes the processing of the sealant composition.

The processing oil may be absent from the sealant composition or may be employed in the sealant composition at 0.1 phr or higher, or at least 1 phr, or at least 2 phr, or at least 4 phr, or at least 5 phr, or up to 40 phr, or up to 20 phr, or up to 10 phr, or up to 8 phr.

4. Polyalkylene Oxide

Polyalkylene oxides suitable for use in the sealant composition include polyethylene glycol, polypropylene glycol, and mixtures thereof. In one embodiment, the polyalkylene oxide is polyethylene glycol. The polyalkylene oxide may have a weight average molecular weight Mw of at least 500, such as at least 2,000, or at least 4,000, or up to 15,000, or up to 12,000, or up to 10,000, or up to 8,500. Polyalkylene oxide may be absent from the sealant composition. In cases where polyalkylene oxide, e.g., polyethylene glycol, is utilized, it may be included in an amount of at least 0.1 phr, such as at least 0.2 phr, or at least 0.3 phr, or up to 5 phr, or up to 3 phr, or up to 2 phr, or up to 1 phr, or up to 0.6 phr.

Examples of commercially available polyethylene glycols include Carbowax™ PEG 3350 and Carbowax™ PEG 8000 from the Dow Chemical Company where the number indicates an approximate weight average molecular weight. Other polyalkylene oxide polymers may be used, as described, for example, in U.S. Pat. Nos 6,322,8111B1 and 4,082,703A.

5. Colorants

The sealant composition may include one or more colorants, in the form of pigments and/or dyes. Both organic and inorganic colorants can be utilized. By including one or more non-black colorants in the sealant composition, the fact that the tire has been punctured is apparent and the location of puncture can be more readily identified. A wide variety of colors can be used for this purpose with light or bright colors, which stand out from the characteristic black color of tire treads, being suitable. For example, white, red, orange, yellow, green, or blue colorants can be included. Red iron pigment can be used to impart a brilliant red color, or a yellow pigment can be used to impart a brilliant yellow color. The colorant may be utilized at from 0.1 phr to 5 phr, such as at least 0.2 phr or up to 4 phr.

Some representative examples of pigments that can be utilized include Pigment Yellow 1 (CAS No. 2512-29-0), Pigment Yellow 110 (CAS No. 5590-18-1), Pigment Yellow 12 (CAS No. 15541-56-7), Pigment Yellow 126 (CAS No. 90268-23-8), Pigment Yellow 127 (CAS No. 68610-86-6), Pigment Yellow 13 (CAS No. 5102-83-0), Pigment Yellow 138 (CAS No. 30125-47-4), Pigment Yellow 14 (CAS No. 5468-75-7), Pigment Yellow 150 (CAS No. 68511-62-6), Pigment Yellow 151 (CAS No. 31837-42-0), Pigment Yellow 154 (CAS No. 68134-22-5), Pigment Yellow 168 (CAS No. 71832-85-4), Pigment Yellow 17 (CAS No. 4531-49-1), Pigment Yellow 174 (CAS No. 78952-72-4), Pigment Yellow 180 (CAS No. 77804-81-0), Pigment Yellow 183 (CAS No. 65212-77-3), Pigment Yellow 191 (CAS No. 129423-54-7), Pigment Yellow 3 (CAS No. 6486-23-3), Pigment Yellow 34 (CAS No. 1344-37-2), Pigment Yellow 42 (CAS No. 51274-00-1), Pigment Yellow 65 (CAS No. 6528-34-3), Pigment Yellow 74 (CAS No. 6358-31-2), Pigment Yellow 75 (CAS No. 52320-66-8), Pigment Yellow 81 (CAS No. 22094-93-5), Pigment Yellow 83 (CAS No. 5567-15-7), C.I. Pigment Yellow 42 (iron oxide), C.I. Pigment Yellow 34 (lead chromates), C.I. Pigment Yellow 184 (bismuth vanadates), C.I. Pigment Yellow 53 (nickel antimony), C.I. Pigment Orange 20 (cadmium sulfide), C.I. Pigment Red 101 (iron oxide), C.I. Pigment Red 104, C.I. Pigment Red 29 (ultramarine pigment), C.I. Pigment Blue 29 (ultramarine pigment), C.I. Pigment Blue 28, C.I. Pigment Blue 36, C.I. Pigment Violet 15 (ultramarine pigment), C.I. Pigment Violet 16 (manganese violet), Pigment Green 17 (chrome oxide green), C.I. Pigment Green 19 (cobalt-based mixed metal oxides), C.I. Pigment Green 26 (cobalt-based mixed metal oxides), and C.I. Pigment Green 50 (cobalt-based mixed metal oxides). Some additional inorganic pigments that can be used include Ultramarine blue, Persian blue, Cobalt blue (CAS No. 1345-16-0), Cerulean blue, Egyptian blue, Han blue ($BaCuSi_4O_{10}$), Azurite blue ($Cu_3(CO_3)_2(OH)_2$, Prussian blue (CAS No. 14038-43-8), YInMn blue (Oregon blue), Realgar red ($\alpha$-$As_4S_4$), cadmium red ($Cd_2SSe$), Cerium sulfide red, Venetian red ($Fe_2O_3$), Red Ochre (anhydrous $Fe_2O_3$), Burnt sienna red, Red lead ($Pb_3O_4$), Vermillion red, Cinnabar red, Ultramarine violet, Han purple ($BaCuSi_2O_6$), Cobalt violet ($CO_3(PO_4)_2$), Manganese violet ($NH_4MnP_2O_7$), Purple of Cassius, Primrose yellow ($BiVO_4$), Cadmium yellow (CdS), Chrome yellow ($PbCrO_4$), Aureolin yellow ($K_3Co(NO_2)_6$), Yellow Ochre ($Fe_2O_3 \cdot H_2O$), Naples yellow, Titanium yellow ($NiO \cdot Sb_2O_3 \cdot 20TiO_2$), Zinc yellow ($ZnCrO_4$), and Chrome orange ($PbCrO_4 \cdot PbO$). Mixtures of colorants may be employed.

In one specific embodiment, the sealant composition includes a white mineral pigment, such as titanium dioxide, and/or a yellow or other non-white pigment or dye. For purposes of computing phr and phf, however, titanium dioxide is considered as a filler, rather than a colorant.

6. Organic Peroxide

An organic peroxide (organoperoxide) is generally present in the sealant composition and serves as a depolymerization agent for the isobutylene-based elastomer component.

The organoperoxide utilized may be one of those generally used for the crosslinking of rubbery polymers. Peroxide compounds which disintegrate only at higher temperatures, e.g., above 75° C., or above 80° C., may be used. Suitable organoperoxides include dialkyl peroxides with the same or different radicals, such as dialkylbenzene peroxides, and alkyl peresters. The organoperoxide may contain two peroxide groups. Frequently, the peroxide groups are attached to a tertiary-butyl group. The basic moiety on which the two peroxide groups are suspended can be aliphatic, cycloaliphatic, or aromatic radicals.

Examples of suitable organoperoxides include bis($\alpha$,$\alpha$-dimethylbenzyl) peroxide (more commonly known as dicumyl peroxide); tert-butyl peroxybenzoate; 2,5-bis(tert-butylperoxy)-2,5-dimethyl hexane; 1,1-di-tert-butyl peroxy-3,3,5-trimethyl cyclohexane; 2,5-dimethyl-2,5-di(tert-butylperoxy)-hexyne-3; p-chlorobenzyl peroxide; 2,4-dichlorobenzyl peroxide; 2,2-bis-(tert-butylperoxy)-butane; tert-butyl cumyl peroxide; di-tert-butyl peroxide; benzoyl peroxide; 2,5-bis(tert-butylperoxy)-2,5-dimethyl hexane; 2,5-dimethyl-2,5-di(tert-butylperoxy)hexane; and mixtures thereof.

In one embodiment, a first organoperoxide serves as a depolymerization initiator and a second organoperoxide serves as a depolymerization propagator. The first organoperoxide is activated at a lower temperature than the second organic peroxide, but tends to decompose quicker. For example, the organoperoxide may include a minor amount of n-butyl 4,4-di(tert-butylperoxy)valerate as a depolymerization initiator and a major amount of dicumyl peroxide as a depolymerization propagator.

Suitable peroxides include those with an active oxygen content (AOC) of at least 2. Active oxygen content is determined by dividing the weight of active oxygen atoms in the compound by its total molecular weight (this is done on the basis of one active oxygen atom for each peroxide moiety (—O—O—) in the compound. For example, tert-butyl cumyl peroxide has one active oxygen atom (molecular weight of 16) and a total molecular weight of 208. Accordingly, the active oxygen content of tert-butyl cumyl peroxide is $16/208$ (7.7%). Peroxides having active oxygen contents of greater than 7%, 8%, 9%, or even 10% are particularly suitable. This is because they generate less gas during the tire curing process than do peroxides having lower active oxygen contents.

The organoperoxide can be added to the sealant composition in pure form (100% active peroxide), or may be supported on an inert, free-flowing mineral carrier or dispersed in an oil, such as a silicone oil. Calcium carbonate is an inert mineral carrier which is frequently utilized for this purpose. Another carrier is a combination of calcium carbonate and calcium silicate.

One example peroxide is in the form of a composite of dicumyl peroxide on precipitated calcium carbonate (40.5% active) available as Di-Cup® 40C from Arkema Inc. Another example peroxide is in the form of a composite of n-butyl 4,4-di-(tert-butylperoxy)valerate with a combination of calcium carbonate and calcium silicate as a mineral carrier, which is available as Trigonox 17-40B pd™ from Nouryon in a 40/60 weight ratio of the organoperoxide to carrier.

It is desirable for the isobutylene-based elastomer component (e.g., butyl rubber) of the sealant composition to be depolymerized by free radicals generated by the organoperoxide to an extent that the storage modulus (G') as measured by a Rubber Process Analyzer (RPA) for the resultant sealant layer after exposure to 170° C. for 5 minutes (measured at 40° C., 1 Hertz, and 5% strain) is at least 50 kPa, or at least 60 kPa, or at least 80 kPa, or at least 90 kPa, or up to 200 kPa, or up to 180 kPa, or up to 170 kPa. A suitable storage modulus (G') may be dependent, to some degree, on the type of tire, including tire size and intended tire service conditions, to promote sealant efficiency of the built-in tire sealant, to promote an ability to seal efficiently against various puncturing objects such as, for example, a nail.

The natural rubber in the sealant composition tends to react with the organoperoxide, thus reducing the amount available to depolymerize the isobutylene-based elastomer component (e.g., butyl rubber). Accordingly, the amount of organoperoxide added to the composition is selected to be sufficient to cause a partial depolymerization of the isobutylene-based elastomer component in situ in the tire. The organoperoxide may be added to the sealant composition in an amount of at least 0.1 phr (expressed as active peroxide), such as at least 0.5 phr, or at least 1 phr, or at least 2 phr, or at least 4 phr, or up to 20 phr, or up to 10 phr, or up to 8 phr.

The exemplary sealant composition does not include a sulfur-based vulcanizing (curing) agent.

In one embodiment, the organoperoxide is activated with an activator, such as a 2,2,6,6-tetra alkyl piperidine hindered amine. An example of such hindered amines is, for example, a poly[[6-[1,1,3,3,-tetramethylbutyl)amino]-s-triazine-2,4-diyl][2,2,6,6,-tetramethyl-4-piperidyl)imino]hexamethylene [(2,2,6,6-tetramethyl-4-piperidyl)imino]] compound, as described, for example, in U.S. Pat. No. 7,674,344B2.

Illustrative sealant compositions, expressed as phr, are shown in Table 1.

TABLE 1

Sealant compositions

| Component | Broad | Medium | Narrow |
|---|---|---|---|
| Isobutylene-based elastomer component (e.g., butyl rubber) | 60-95 | 75-92 | 80-90 |
| Crosslinkable diene-based component (e.g., natural rubber) | 5-40 | 8-25 | 10-20 |
| Total elastomers | 100 | 100 | 100 |
| Fillers (e.g., silica and optionally one or more of clay, titanium dioxide, and calcium carbonate, carbon black) | 5-75 | 6-40 | 8-20 |
| Colorant, e.g., yellow pigment or dye | 0-8 | 0.1-5 | 0.1-3 |
| Processing oil | 0-40 | 0.1-12 | 1-10 |
| Polyalkylene glycol, e.g., PEG | 0-10 | 0.1-5 | 0.3-3 |
| Organoperoxide, e.g., dicumyl peroxide | 0.5-20 | 1-10 | 2-8 |

As will be appreciated, combinations of the above ranges may be employed.

Forming the Sealant Composition

The various components of the sealant layer can be mixed together using convenient rubber mixing equipment, such as an internal rubber mixer. In general, the elastomers, e.g., butyl rubber and natural rubber, are blended in at least one sequential preparatory, or non-productive, mixing stage in the absence of the organoperoxide followed by a final, or productive, mixing stage in which the organoperoxide (and possibly one or more of the additional ingredients) is added.

In one embodiment, in a first, non-productive stage (or stages), the components, other than the organoperoxide, are stirred in a mixer set at a suitable temperature, such as at least 100° C., or at least 110° C., or up to 180° C. The temperature of the mixture rises as it is stirred. When the temperature reaches a desired value, the mixture is dropped from the mixer and allowed to cool before returning it to the mixer. In a second, productive stage, the mixture is returned to the mixer with the organoperoxide. The mixer is set at a temperature below the decomposition temperature of the organoperoxide, e.g., 70° C., or below, such as about 60° C. The mixture is dropped from the mixer at a maximum temperature of about 85° C., to minimize premature decomposition of the peroxide.

Tire Construction

A sealant layer, formed of the sealant composition described above, may be built into an unvulcanized tubeless pneumatic rubber tire prior to undergoing vulcanization. In building the tire, the sealant composition may be encapsulated, in the form of a layer or layers, in one or more enclosures within the tire. The enclosure(s) may be defined, at least in part, by one or more containment layers, which are formed of a stiff rubber, which makes the handling the sealant composition and building it into a tire relatively easy.

In one embodiment, the tire includes a generally toroidal-shaped supporting carcass, an outer circumferential tread, and an inner containment layer, such as an inner liner (or "innerliner"). As used herein, the term "tread" refers both to the portion of a tire that comes into contact with the road under normal inflation and load and any subtread. The inner liner is an air barrier layer that serves to keep air or another gas, such as nitrogen, which is used to inflate the tire, from escaping through the tire structure by diffusion. The inner liner may be formed of a halobutyl rubber or some other suitable material having a high degree of resistance to gas permeation. The sealant layer may be positioned intermediate the supporting carcass and the inner liner or other containment layer. In another embodiment, two or more inner liner layers serve as containment layers for the sealant.

Figure 3:
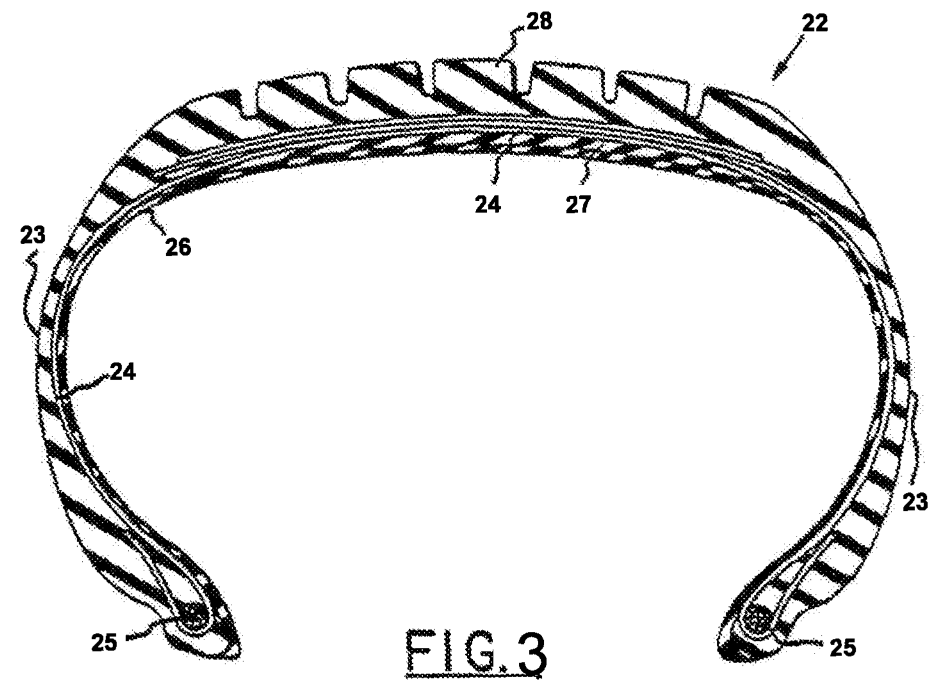
FIG. 3 is a cross-sectional view of a tire with a sealant layer disposed between a containment layer and a carcass of the tire, in accordance with another aspect of the exemplary embodiment.

In one embodiment, the sealant layer is positioned between, and optionally in direct contact with, the supporting carcass and an inner liner of the tire, as illustrated in FIG. 1. In another embodiment, the sealant layer formulation is positioned between, and optionally in direct contact with, two inner liner layers, as is illustrated in FIG. 2. In this case, the sealant layer is sandwiched between first and second layers of inner liner and spaced from the tire carcass and tread by the first and second layers of inner liner, respectively. As an alternative to one or more of the inner liner layer(s), one or more other containment layers may be employed. In another embodiment, the tire does not include any inner liner layers and the sealant composition is built (extruded) into the tire between the supporting carcass and a different type of containment layer of the tire, as illustrated in FIG. 3. As will be appreciated, multiple sealant layers may be provided, with each pair of adjacent sealant layers being spaced by an intermediate containment layer. The carcass and/or tread may include one or more reinforcement plies formed of fabric, polyethylene sheet, and/or metal.

In the embodiment of FIG. 1, a self-sealing pneumatic rubber tire 2 of the tubeless type is shown. The tire has sidewalls 3, a supporting carcass 4, inextensible beads 5, an inner liner (air barrier layer) 6, a sealant layer 7, and an outer circumferential tread (tread portion) 8, which extends from the sidewalls. The individual sidewalls 3 extend radially inward from the axial outer edges of the tread portion 8 to join the respective inextensible beads 5. The supporting carcass 4 acts as a supporting structure for the tread portion 8 and sidewalls 3. The sealant layer 7 is disposed inwardly from the supporting carcass 4 and outwardly from the inner liner 6. The outer circumferential tread 8 is adapted to be ground contacting when the tire is in use.

In the embodiment of FIG. 2, a self-sealing pneumatic rubber tire 10 is shown. This pneumatic tire is of the tubeless type and includes a tread portion 11, a crown area 12, sidewalls 13, a supporting carcass 14, inextensible beads 15, an inner liner composed of inner and outer layers 16A, 16B, and sealant layer 17. In this embodiment, the sealant layer 17 is sandwiched between the two layers 16A, 16B of the inner liner. Thus, sealant layer 17 is disposed radially inwardly from one layer 16A of inner liner and outwardly from another layer 16B of inner liner. Both layers of inner liner 16 and the sealant layer 17 are disposed radially inwardly from the supporting carcass 14.

In the embodiment of FIG. 3, a self-sealing pneumatic rubber tire 22 of the tubeless type, which is free of an inner liner, is illustrated. The self-sealing pneumatic rubber tire 22 includes sidewalls 23, a supporting carcass 24, inextensible beads 25, a containment layer 26, a sealant layer 27, and an outer circumferential tread (tread portion) 28. The individual sidewalls 23 extend radially inward from the axial outer edges of the tread portion 28 to join the respective inextensible beads 25. The supporting carcass 24 acts as a supporting structure for the tread portion 28 and sidewalls 23. The sealant layer 27 is disposed inwardly from the supporting carcass 24 and outwardly from the containment layer 26. In particular, the sealant layer 25 is sandwiched between the supporting carcass 24 and the containment layer 26. The outer circumferential tread 28 is adapted to be ground contacting when the tire is in use. In this embodiment, the containment layer 26 is disposed inwardly from the sealant layer 27 and is the innermost layer of the tire 22.

The sealant layer 7, 17, 27 may extend at least from one sidewalls of the tire to the other, in other words, it may have a length which encompasses the tread area 8, 11, 28 of the tire.

The thickness of the sealant layer can vary greatly in an unvulcanized puncture sealant tire. In one embodiment, the thickness of the sealant layer is from 0.2 mm to 8.5 mm, such as at least 3 mm, or at least 4 mm, or up to 6 mm, or up to 5 mm. In passenger tires, a thickness of about 4.5 mm may be used.

The tread, sidewalls, and carcass may each be formed of a sulfur-curable rubber composition, which may be the same or different. Example elastomers for forming the rubber compositions used in these components may include one or more of natural rubber, synthetic polyisoprene, natural polyisoprene, styrene-butadiene copolymer, solution-polymerized styrene-butadiene (SSBR), emulsion-polymerized styrene-butadiene rubber (ESBR), butadiene rubber (BR), halobutyl rubber, bromobutyl rubber, chlorobutyl rubber, nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, polyolefins, amorphous polyolefins, semi-crystalline polyolefins, alpha-polyolefins, reactor-ready polyolefins, acrylates, metallocene-catalyzed polyolefin polymers and elastomers, reactor-made thermoplastic polyolefin elastomers, olefin block copolymer, co-polyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends and/or in pendant positions within the polymer.

As an example, a tire tread rubber composition includes 100 phr of an elastomer component, such as a mixture of styrene-butadiene rubber and polybutadiene with the optional use of natural rubber, polyisoprene, or a combination thereof.

In one embodiment, the rubber compositions used to form the tread, sidewalls, carcass and/or containment layer (s) do not include butyl rubber or include no more than 5 phr of butyl rubber.

In addition to the elastomers, the rubber compositions for forming the tread, sidewalls, and carcass may include one or more reinforcing fillers; one or more processing aids, such as liquid plasticizers (e.g., an oil), resins, waxes, antioxidants, antidegradants, and/or antiozonants; and a cure package, which includes a sulfur-based vulcanizing agent. The cure package may further include one or more cure accelerators and/or activators, which act as catalysts for the vulcanization agent.

Reinforcing fillers, in a total amount of at least 1 phr, or up to 200 phr, may include one or more of silica, carbon black, alumina, aluminum hydroxide, clay (reinforcing grades), magnesium hydroxide, boron nitride, aluminum nitride, and titanium dioxide. Suitable silicas and carbon blacks may be as described above for the sealant composition. Silica may be present in the rubber composition at from 1 to 200 phr, e.g., at least 3 phr, or at least 10 phr. Carbon black may be present at from 5 phr to 200 phr, such as at least 10 phr or up to 80 phr, or up to 50 phr.

Examples of sulfur-based vulcanizing agents include elemental sulfur (free sulfur), insoluble polymeric sulfur, soluble sulfur, sulfur donating vulcanizing agents, for example, an amine disulfide, polymeric polysulfide, or sulfur olefin adduct, and mixtures thereof. Sulfur vulcanizing agents may be used in an amount of from 0.1 to 10 phr, such as at least 0.5 phr, or at least 1 phr, or up to 8 phr, or up to 5 phr. In other embodiments, sulfur vulcanizing agents are absent from the rubber composition.

Examples of cure activators include zinc oxide, and fatty acids, such as stearic acid, and combinations thereof. Examples of cure accelerators include amines, disulfides, guanidines, thioureas, thiazoles, thiurams, sulfenamides, dithiocarbamates, xanthates, and combinations thereof.

An example composition for forming a tread includes a mixture of elastomers, a filler consisting of silica and carbon black, stearic acid, a processing oil, zinc oxide an antioxidant a paraffin wax, and optionally a silane coupling agent.

The tire inner liner, where used, may be a halobutyl rubber-based layer formed from a sulfur curative-containing halobutyl rubber composition of a halobutyl rubber, such as chlorobutyl rubber or bromobutyl rubber. The inner liner layer may also contain one or more sulfur-curable diene-based elastomers such as, for example, cis-1,4-polyisoprene natural rubber, cis-1,4-polybutadiene rubber and styrene/butadiene rubber, and their mixtures, in particular, a combination of one or more of the halobutyl rubbers and one or more of the diene-based elastomers.

Incorporating the Sealant Composition in a Tire

The sealant composition, e.g., in the form of strips of material, is incorporated in an uncured tire. The components of the tire may be assembled in a mold or on a core, and then cured.

In one embodiment, the tire is formed in a mold. In another embodiment, the tire is formed on a torus shaped core or tire blank. When formed on a core, the tire may be progressively, built up in layers, starting with the inner-most layer, which may be an inner liner layer or other containment layer. The inner liner/other containment layer may be applied by an extruder using strips of rubber or in sheet form or by other suitable methods. An optional bead, such as a column bead of one or more wires may be applied in the bead area over the inner liner layer/containment layer. A layer of the unreacted sealant is then applied, optionally followed by a second inner liner layer. Finally, the carcass, sidewalls, and tread are built up. As will be appreciated, a two layer inner liner incorporating the sealant composition may be applied to the core as one piece. When formed in a mold, the tire may be built from the outside in, i.e., in the reverse order. The formation of the unvulcanized tire is not limited to any particular method, as long as the sealant layer is enclosed within it.

In one embodiment, the sealant layer is positioned between a carbon black reinforced rubber inner liner layer of the tire and the tire carcass, or between two carbon black reinforced tire rubber inner liner layers. The tire may have a rubber tread and rubber sidewalls containing rubber-reinforcing carbon black.

After the unvulcanized tire is built so as to include a layer of the unreacted sealant formulation, it is vulcanized. This may include heating the tire to a temperature of at least 80° C. to partially depolymerize the butyl rubber. Higher temperatures are then used to cure the rubber compositions for the tread, carcass, and sidewalls.

Vulcanization of the unvulcanized tires can be performed over a wide temperature range, such as a temperature which is within the range of 100° C. to 200° C., such as at least 130° C., or at least 140° C., or up to 170° C., or up to 165° C. In one embodiment, the tire may reach a maximum curing temperature of 160° C. to 165° C. The cure cycle used to vulcanize the uncured tires may have a duration of 4 minutes to 240 minutes, such as 10 minutes to 25 minutes, or 10 minutes to 17 minutes, or 11 minutes to 13 minutes. Any suitable vulcanization process can be used, such as heating in a press or mold and/or heating with superheated steam or hot air.

The at least partial depolymerization of the isobutylene-based elastomer component of the sealant composition layer built into the tire (e.g., between the tire inner liner and tire carcass) occurs during the vulcanization of the tire itself at an elevated temperature via the organoperoxide. In practice, upon vulcanization of the tire assembly under conditions of elevated temperature, a major portion of the isobutylene-based elastomer component in the sealant composition is depolymerized in the presence of the activated organoperoxide. The unreacted sealant layer is thus transformed into a puncture sealant layer during the curing of the tire. The sealant layer may bond to the adjacent layers of the tire in the process.

In one embodiment, the sealant composition is incorporated into the uncured tire in the form of a strip or strips of material. The strip(s) can be prepared using conventional equipment, such as a calender, extruder, or combination thereof, and the strip of sealant composition assembled into the tire. The thickness of the sealant composition layer can be at least 1 mm, or up to 12 mm. For passenger tires, the sealant composition layer may have a thickness of 2-5 mm, whereas for truck tires, a thickness of 5-9 mm may be used. A width of the sealant layer may be sufficient to extend at least the width of the tread of the tire, such as at least 5 cm, or at least 10 cm.

Without intending to limit the scope of the invention, the following examples illustrate preparation and evaluation of sealant compositions.

EXAMPLES

Sealant compositions are prepared using different ratios of butyl rubber to natural rubber, different amounts of peroxide, and different amounts of silica to demonstrate that the viscosity and hysteresis of the sealant composition, when reacted, can be modified to reduce excessive flow-out, as compared with a composition that does not include natural rubber. In the examples below, the hysteresis is also shown to be reduced by lowering the amount of filler and/or by the amount of peroxide. However, since natural rubber tends to crosslink with the peroxide, a sufficient amount of peroxide to ensure decomposition of the butyl rubber is employed.

The unreacted sealant compositions shown in Table 2 are prepared in two stages. In a non-productive stage, the components other than the peroxide, are mixed in a mixer set at 120° C. and about 100 rpm. The temperature rises to about 160° C. and the mixture is dropped after about four minutes. In a productive stage, the mixture is returned to the mixer set at about 60° C. and about 60 rpm. The mixture is dropped at a maximum temperature of 85° C. (to minimize decomposition of the peroxide).

Example 1 is a comparative sealant composition. Two batches of Example 1 are prepared for assessing reproducibility. Examples 2-4 are exemplary compositions containing a mixture of butyl rubber and natural rubber. Examples 5 and 6 are comparative compositions without natural rubber.

All components are expressed as parts per hundred rubber (phr), by weight.

TABLE 2

| Sealant Compositions | | | | | | |
|---|---|---|---|---|---|---|
| | Ex. 1 | Ex. 2 | Ex. 3 | Ex. 4 | Ex. 5 | Ex. 6 |
| Natural Rubber[1] | — | 10.0 | 10.0 | 20.0 | — | — |
| Butyl rubber[2] | 100.0 | 90.0 | 90.0 | 80.0 | 100.0 | 100.0 |
| Silica[3] | 11.0 | 9.0 | 9.0 | 9.0 | 9.0 | 9.0 |
| Clay[4] | 10.0 | — | — | — | — | — |
| Titanium dioxide[5] | 2.0 | — | — | 0.5 | — | — |
| Petroleum-based processing oil[6] | 3.0 | — | 5.0 | 8.0 | — | — |
| [7]Polyalkylene oxide | 0.5 | 0.5 | 0.5 | 0.5 | 0.5 | 0.5 |
| Yellow pigment[8] | 0.8 | 0.8 | 0.8 | 0.8 | 0.8 | 0.8 |
| Dicumyl peroxide[9] | 5.67 | 5.67 | 5.67 | 5.67 | 3.44 | 2.84 |
| Calcium carbonate (in peroxide) | 8.33 | 8.33 | 8.33 | 8.33 | 5.06 | 4.16 |
| Total phr | 141.3 | 129.3 | 129.3 | 132.8 | 118.8 | 117.3 |

[1]TSR 20, produced from field grade coagulum (cuplump) from the *Hevea brasiliensis* tree grown in Indonesia.
[2]Exxon ™ Butyl 068, obtained from ExxonMobil Chemical. It contains a non-staining antioxidant as an additive. Mooney Viscosity, according to ASTM D1646-19a, of about 51.
[3]HI-SIL ™ 532 EP synthetic amorphous silica, with a surface area (BET) of about 60 $m^2/g$ from PPG Industries, Inc.
[4]Polyfil ® HG90 kaolin clay (hydrous aluminum silicate) from KaMin Performance Industries, with a surface area (BET) of about 21 $m^2/g$.
[5]Cotiox ™ KA-100 titanium dioxide with a particle size of about 0.25 - 0.35μ, from Cosmo Chemical Co., Ltd.
[6]Hyprene ™ 100 naphthenic process oil, with a viscosity of about 22.3 cSt at 40° C. according to ASTM D445, from Ergon Refining, Inc.
[7]Polyethylene glycol Carbowax ™ PEG 8000, with a weight average molecular weight of about 8000, from Univar.
[8]Akrosperse E-6837TM yellow pigment 12 with an EPR (ethylene/propylene rubber) (50%/50%) from the Akrochem Company.
[9]Di-Cup ® 40C dicumyl peroxide on precipitated calcium carbonate (40.5% active) from Arkema Inc.
Note:
The levels indicated in Table 1 are levels of active dicumyl peroxide.

Evaluation of Samples

The samples are milled after the productive stage to a thickness of less than 0.5 cm. After they cool down, a die cutter is used to die the samples to dimensions suitable for the RPA testing.

A rubber process analyzer (RPA), RPA2000 is used to characterize the samples. After the samples are loaded, they are exposed to a temperature of 170° C. for 5 minutes. Dynamic mechanical analysis takes place and values for the Storage Modulus G' at 1%, 3%, and 5% strain (MPa) are obtained at a temperature of 40° C. Tangent delta values (the ratio of G" to G') are also obtained.

RPA results are shown in Table 3.

TABLE 3

| Rubber Process Analyzer Results | | | | | | | |
|---|---|---|---|---|---|---|---|
| Test | Ex. 1 | Ex. 1 (rpt) | Ex. 2 | Ex. 3 | Ex. 4 | Ex. 5 | Ex. 6 |
| G' at 1% strain (MPa) | 0.108 | 0.11 | 0.157 | 0.117 | 0.150 | 0.101 | 0.128 |
| G' at 3% strain (MPa) | 0.097 | 0.097 | 0.164 | 0.113 | 0.152 | 0.095 | 0.126 |
| G' at 5% strain (MPa) | 0.085 | 0.085 | 0.158 | 0.112 | 0.150 | 0.092 | 0.123 |

TABLE 3-continued

| Rubber Process Analyzer Results | | | | | | | |
|---|---|---|---|---|---|---|---|
| Test | Ex. 1 | Ex. 1 (rpt) | Ex. 2 | Ex. 3 | Ex. 4 | Ex. 5 | Ex. 6 |
| tan delta at 1% strain | 0.691 | 0.067 | 0.438 | 0.514 | 0.419 | 0.611 | 0.524 |
| tan delta at 3% strain | 0.827 | 0.84 | 0.483 | 0.601 | 0.464 | 0.695 | 0.611 |
| tan delta at 5% strain | 0.914 | 0.912 | 0.493 | 0.606 | 0.483 | 0.724 | 0.627 |

Example 5, prepared with lower levels of filler and organoperoxide than Example 1, has comparable G' values, but with a lower hysteresis, as indicated by the lower tangent delta results. Example 6, with a filler level the same as for Example 5, but an even lower organoperoxide level, shows a further decrease in tangent delta, while having a slightly increased G'. Examples 2 and 3 and 4, containing natural rubber, also exhibited lower hysteresis than Example 1.

Sealability

For evaluating the ability of the example compositions to seal a puncture, a simulated tire assembly is prepared in which a pressed sealant layer of 3 mm in thickness is positioned between a 5 mm layer of "tread" and 2 plies of material, 1 mm each, on one side of the sealant layer, and a 1 mm inner liner layer on the other. The assembly is sealed along its edges and cured at 170° C. for 11-12 minutes. After cooling, the sample is mounted to a test fixture, and an air pressure of 138 kPa is applied to the inner liner side of the assembly.

Each sample is punctured with two small nails (2.5 mm diameter), two medium nails (3.4 mm diameter), and two large nails (5 mm diameter), taking care to ensure the nails travel entirely through the test specimen but leave enough of the nail protruding from the sample to be able to pull it out when testing.

The samples are pressurized to 241 kPa and maintained at that pressure for few minutes. The nails are then pulled out. A sealability metric is computed which takes into account:

1. Puncture sealing: A weighted measure of the number of punctures that seal (higher weight being accorded to larger nails).
2. Sealing efficiency: whether or not the puncture seals immediately.

The sealing metric thus gives generally higher values to samples that exhibit better sealing characteristics. Table 4 shows the results obtained.

TABLE 4

| Sealability Metric | | | | | |
|---|---|---|---|---|---|
| | Ex. 2 | Ex. 3 | Ex. 4 | Ex. 5 | Ex. 6 |
| Sealability metric | 90 | 100 | 90 | 70 | 100 |

Example 4 is not a direct comparison as it was evaluated in tire sealability test in which a cured tire is mounted and inflated and punctured with 36 nails, 9 nails of each size. All samples performed relatively well, with Example 5 showing the poorest sealability metric.

Upon completion of the sealability test, the samples are reinflated and monitored for two days, with any small leaks in samples patched by reinserting the nails. All samples are then reinflated and monitored for seven more days. The samples are then examined visually. All the natural rubber-containing samples fully retained the air pressure with substantially no sealant coming out of the punctures. For the samples without natural rubber, significant leakage of the sealant was observed and a reduction in the pressure.

It is concluded that the natural rubber network plays a significant role in containing the sealant in the enclosure and retaining the pressure for the duration of the experiment.

Unexpectedly, compositions with comparable RPA properties and similar sealability metric were observed to have significant differences in long-term behavior. The natural rubber-containing compositions maintained the sealant in the sample for the duration of the one week experiment, and they subsequently maintained the full air pressure as well.

The results demonstrate that natural rubber-containing compositions can seal nail punctures in tires by flowing to fill the voids, yet do not exhibit continued flow out of the enclosure and into the tire cavity or onto the tread.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. An uncured pneumatic tire comprising:

a circumferential tread;

a supporting carcass attached to the tread;

a sealant layer comprising a sealant composition, the sealant composition comprising:

100 phr elastomers, comprising:

at least 60 phr of an isobutylene-based elastomer component, and at least 5 phr of a conjugated diene-based elastomer component;

at least 5 phr of particulate filler; and at least 0.5 phr of an organic peroxide; and a containment layer, the sealant layer being disposed between the supporting carcass and the containment layer.

2. The uncured pneumatic tire of claim 1, wherein the sealant composition further comprises a colorant which provides the sealant with a non-black color.

3. The uncured pneumatic tire of claim 2, wherein the colorant is selected from yellow pigments, yellow dyes, and mixtures thereof.

4. The uncured pneumatic tire of claim 1, wherein the isobutylene-based elastomer component is selected from the group consisting of butyl rubber, polyisobutylene, and mixtures thereof.

5. The uncured pneumatic tire of claim 3, wherein the isobutylene-based elastomer component is at least 80 wt. % butyl rubber.

6. The uncured pneumatic tire of claim 1, herein the isobutylene-based elastomer component comprises butyl rubber with a weight average molecular weight of at least 5,000 and/or of no more than 800,000.

7. The uncured pneumatic tire of claim 1, wherein the sealant composition comprises at least 75 phr of the isobutylene-based elastomer.

8. The uncured pneumatic tire of claim 1, wherein the conjugated diene-based elastomer component is selected from the group consisting of natural rubber, synthetic polyisoprene, polybutadiene, styrene-butadiene copolymer, and mixtures and copolymers thereof.

9. The uncured pneumatic tire of claim 8, wherein the conjugated diene-based elastomer component is at least 80 wt. % natural rubber.

10. The uncured pneumatic tire of claim 1, wherein the sealant composition comprises at least 8 phr of the conjugated diene-based elastomer component.

11. The uncured pneumatic tire of claim 1, wherein the sealant composition comprises up to 40 phr of the particulate filler.

12. The uncured pneumatic tire of claim 1, wherein the particulate filler comprises at least one of silica, titanium dioxide, calcium carbonate, and carbon black.

13. The uncured pneumatic tire of claim 12, wherein the sealant composition comprises at least 5 phr of silica.

14. The uncured pneumatic tire of claim 1, wherein the organic peroxide is selected from dicumyl peroxide; 2,5-bis (tert-butylperoxy)-2,5-dimethyl hexane; 1,1-di-tert-butyl peroxy-3,3,5-trimethyl cyclohexane; 2,5-dimethyl-2,5-di (tert-butylperoxy) hexyne-3; p-chlorobenzyl peroxide; 2,4-dichlorobenzyl peroxide; 2,2-bis-(tert-butylperoxy)-butane; tert-butyl cumyl peroxide; di-tert-butyl peroxide; benzoyl peroxide; 2,5-bis(tert-butylperoxy)-2,5-dimethyl hexane; 2,5-dimethyl-2,5-di(tert-butylperoxy) hexane; and mixtures thereof.

15. The uncured pneumatic tire of claim 1, further comprising at least 0.1 phr of polyalkylene glycol.

16. The uncured pneumatic tire of claim 1, wherein the containment layer comprises a halobutyl rubber.

17. A cured pneumatic tire formed by curing the uncured pneumatic tire of claim 16 at a sufficient temperature for the organic peroxide to at least partially depolymerize the isobutylene-based elastomer component.

* * * * *